Aug. 13, 1935.  L. A. WOOD  2,011,533
RECOVERY OF TIN FROM TIN ORES
Filed Dec. 22, 1933
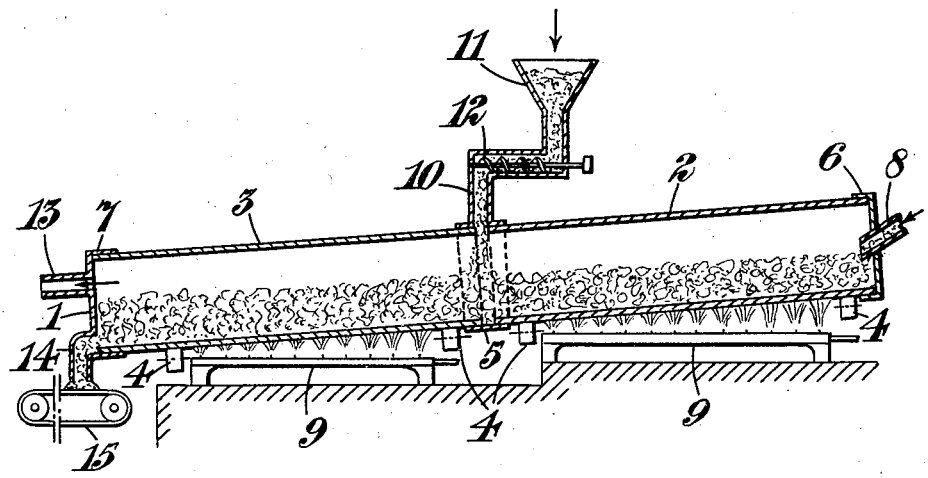
INVENTOR
Louis A. Wood.
By Watson, Coit, Morse & Grindle
ATTYS.

Patented Aug. 13, 1935

2,011,533

UNITED STATES PATENT OFFICE 2,011,533

RECOVERY OF TIN FROM TIN ORES

Louis Albert Wood, London, England, assignor to British American Mines Limited, London, England, a British company Application December 22, 1933, Serial No. 703,631
In Great Britain December 24, 1932

10 Claims. (Cl. 75—67)

This invention comprises improvements in or relating to the recovery of tin from tin ores.

It is an object of this invention to facilitate the recovery of tin from tin ores by a chloridization process similar in some respects to that described in United States Patent application Serial No. 627,943 and United States Patent No. 1,931,944 in which tin ores were heated in admixture with carbonaceous materials and calcium chloride to a temperature of the order of 800° C. with the result that stannous chloride was evolved from the mixture, was led away as vapour and was separately condensed.

In the present specification the expression "tin ores" is intended to include materials on which concentration or like preparatory treatment has been expended and is not limited to the ore as mined.

Experiments with chloride, other than calcium chloride, in the presence of carbon have shown markedly reduced recoveries of tin which is thought to be due to the fact that during the initial heating stage the chlorides which may be used become volatilized and lost from the mixture at temperatures lower than those at which the carbonaceous material present effects a reducing action upon the tin ore. Consequently, when the proper reaction temperature for the production of the stannous chloride is reached the other chlorides present may have partially disappeared with adverse results upon the recovery.

Quite apart from the adverse effect upon the recovery in the case of the use of the more volatile chloridizing agents there is the risk, when ferric oxide is present, of the production of ferric chlorides which itself is volatile and may lead to premature removal of chlorine carrying products.

I have found that in batch treatment of such ores if the ore is preheated to the reaction temperature and partially reduced to convert ferric oxide ($Fe_2O_3$) which may be present in the ore to ferroso-ferric oxide ($Fe_3O_4$), then loss of chlorine by evolution and passing away from the ore of ferric chloride or other chlorine carrying products is largely prevented. Even in cases where chlorine carrying products are evolved the loss may be obviated provided that before the products are able to escape from the zone of treatment the evolved vapours are brought into contact with a zone of ore where reducing conditions exist.

According to the present invention therefore a process for the recovery of tin from tin ores by chloridization and volatilization as stannous chloride is characterized by the fact that the ore is first heated and partially reduced and thereafter the chloridizing agent is introduced to the heated and partially reduced ore.

One form of the process for the recovery of tin from tin ores by chloridization and volatilization as stannous chloride in the presence of oxidized iron is characterized by so conducting the process that the chloridizing agent is raised to the reaction temperature in the presence of, or gases produced are prevented from escaping without coming into contact with a heated body of partially reduced ore so that loss of chlorine is minimized.

In carrying the invention into effect the ore may be heated in admixture with solid carbonaceous material to effect the reduction and also to assist the chloridizing reaction.

Alternatively, or in addition, the outgoing vapours from the chloridizing furnace are caused to pass through or over a portion of ore which has already been heated and reduced, for example partially chloridized ore. This facilitates the application of the process as a continuous process in a rotating tubular furnace in which case the ore may be continuously introduced into and carried through a treatment furnace wherein the chloridization reaction is caused to occur and the volatile reaction products are caused to pass through the furnace along with the ore and removed at or near the place of removal of the ore. When the ore is of a basic nature chloridization may conveniently be effected with the aid of a chloride such as calcium or ferrous chloride.

The following is a description by way of example of a test in accordance with the invention:—

The ore employed was a naturally occurring sample from Siam. Complete analysis showed it to consist of:—$SiO_2$—19.4%; $SnO_2$—5.47% (Sn—4.308%); $Fe_2O_3$—53.35%; FeO—0.4%; $Al_2O_3$ and $TiO_2$—4.35%; $P_2O_5$—0.27%; CaO—5.83%; MgO—0.25%; S—0.09%; As—0.35%; MnO—1.9%; CuO—0.25%; Bi-trace; volatiles—9.09%.

It was crushed to pass a screen of square aperture of $\frac{1}{16}$th inch linear dimensions.

500 grammes of this ore were heated to 800° C. in a laboratory furnace of cylindrical type revolving at a speed of one revolution in forty-five seconds. To the hot ore was added 10 grammes (2%) of charcoal crushed to $\frac{1}{16}$th inch and a period of ten minutes allowed for preliminary reduction to take place. A mixture of 60 grammes (12%) of crushed crystalline ferrous chloride with a further 20 grammes (4%) of charcoal was then added. Evolution of stannous chloride was rapid at first and appeared complete in less than one hour. The temperature was maintained between 800 to 820° C. for one and a half hours after which the ends of the reaction chamber were closed and the charge allowed to cool.

The residue weighed 412 grammes and assayed 0.56% of tin, the indicated extraction being 89.3% of the tin originally present.

In the above example the ratio of chloride used to chlorine theoretically required to combine with the tin contents of the ore was 1.68:1.

For the purpose of comparison a mixture of ore, charcoal and ferrous chloride was made at atmospheric temperature in the proportions used above, i. e. 500 parts of ore, 30 parts charcoal, and 60 parts ferrous chloride, the ingredients being taken from the same bulk samples. This mixture was heated to about 800 to 810° C. for two hours in a closed fire-clay crucible provided with a vent hole. The hole was then closed and the charge cooled. The residues weighed 412 parts and assayed 2.26% of tin. The indicated extraction in this case was only 56.8% of the total original tin contents of the ore.

The accompanying drawing is a purely diagrammatic representation of one form of apparatus for carrying into effect the process according to the invention in a continuous manner.

A muffle chamber 1 of small cylindrical cross section relatively to its length is divided into two sections 2 and 3 both of which are supported for rotation upon rollers 4. Sections 2 and 3 are connected by an intermediate stationary section 5 provided with seals to form a gas-tight joint whilst yet permitting rotation of sections 2 and 3 driven by suitable mechanism. The ends of the chamber 1 are closed by fixed covers 6 and 7 also having gas-tight connection to the rotatable sections. The muffle chamber 1 is disposed at a slight inclination and the cover 6 at the upper end of the chamber has an opening therein through which projects an ore-delivery chute 8. Owing to the inclination and rotation of the muffle chamber ore which is introduced through chute 8 at a predetermined rate admixed with a controlled amount of carbonaceous material will be gravity fed towards the lower end of the muffle chamber in well-known manner. Oil burners 9 or other suitable means are provided for heating the two sections of the muffle, and the ore during its passage through section 2 becomes partially reduced and preheated to a high temperature. A reagent inlet 10 opens into the muffle from the intermediate section 5 and a chloridizing agent, for example, calcium chloride is admitted therethrough from a hopper 11 at a predetermined rate set by a screw conveyor 12 which also forms a gas-tight seal. In its continued passage down the muffle the ore is thus mixed with the chloridizing agent and the volatile products of the reaction pass along with the treated ore and are carried away through a port 13 in cover 7 to suitable condensing and scrubbing apparatus. The reduced ore finally emerges from the muffle through an exit port 14 and the issuing material may serve as a self-seal to the volatile reaction products, and is carried away upon a conveyor 15.

It is possible that in continuous operation as just described the step of adding the carbon first and deferring the addition of the chloridizing agent until the ore has been partially pre-reduced may in some cases be eliminated, since the evolved vapours are led through or over parts of the ore which have already undergone the heat treatment and which will therefore be partially reduced and will thus absorb any chlorine carrying vapors other than stannous chloride which may have been produced in the earlier stages.

I claim:—

1. A process for the extraction of tin from tin ores containing iron oxides by chloridization and volatilization as stannous chloride wherein the ore is first heated with a reducing agent at such a temperature that the iron oxide is reduced to a lower state of oxidation while leaving the tin oxide unreduced, and thereafter a normally solid chloridizing agent is introduced to the partially reduced ore while the latter is still heated and heating is continued at over 600° C. so that volatile reaction products are collected containing stannous chloride and this is then separated from the products.

2. A process for the extraction of tin from tin ores containing iron oxide by chloridization and volatilization as stannous chloride wherein the ore is admixed with solid carbonaceous material, then heated so that the iron oxide is partially reduced by the action of the carbonaceous constituent while leaving the tin unreduced and thereafter a normally solid chloridizing agent is introduced to the partially reduced ore while the latter is still hot and heating is continued at over 600° C. so that volatile reaction products containing stannous chloride are given off, these are collected and stannous chloride separated therefrom.

3. A process for the extraction of tin from tin ores containing iron oxide by chloridization and volatilization as stannous chloride wherein ore is continuously introduced into and carried through a treatment furnace where it is first heated to a temperature adequate to effect partial reduction of the iron oxide without reducing the tin, a normally solid chloridizing agent is added to the heated and partially reduced ore, to effect the chloridization reaction while the ore is still only part-way through the furnace, and volatile products from the reaction are caused to pass along with the ore and are removed at or near the place of removal of the ore from the furnace.

4. A process for the extraction of tin from tin ores as claimed in claim 1 wherein chloridization is effected with the aid of calcium chloride.

5. A process for the extraction of tin from tin ores as claimed in claim 3 wherein chloridization is effected with the aid of calcium chloride.

6. A process for the extraction of tin from tin ores containing iron oxide by chloridization and volatilization as stannous chloride wherein ore is continuously introduced into and carried through a treatment furnace where it is first heated to a temperature adequate to effect partial reduction of the iron oxide without reducing the tin, thereafter a normally solid chloridizing agent and a normally solid reducing agent are added to the partially reduced ore to effect the chloridization reaction while the ore is still only part-way through the furnace, and volatile products from the reaction are caused to pass along with the ore and removed at or near the place of removal of the ore from the furnace.

7. A process for the extraction of tin from tin ores as claimed in claim 1 wherein chloridization is effected by the employment as chloridizing agent of ferrous chloride.

8. A process for the extraction of tin from tin ores as claimed in claim 2 wherein chloridization is effected by the employment as chloridizing agent of ferrous chloride.

9. A process for the extraction of tin from tin ores as claimed in claim 3 wherein chloridization is effected by the employment as chloridizing agent of ferrous chloride.

10. A process for the extraction of tin from tin ores as claimed in claim 6 wherein chloridization is effected by the employment as chloridizing agent of ferrous chloride.

LOUIS ALBERT WOOD.